United States Patent
Xiao et al.

(10) Patent No.: US 8,537,575 B2
(45) Date of Patent: *Sep. 17, 2013

(54) POWER CONVERTER AND INTEGRATED DC CHOKE THEREFOR

(71) Applicants: Yuan Xiao, Kitchener (CA); Navid R. Zargari, Cambridge (CA); Zhongyuan Cheng, Cambridge (CA); Lixiang Wei, Mequon, WI (US)

(72) Inventors: Yuan Xiao, Kitchener (CA); Navid R. Zargari, Cambridge (CA); Zhongyuan Cheng, Cambridge (CA); Lixiang Wei, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,655

(22) Filed: Feb. 1, 2013

(65) Prior Publication Data

US 2013/0141950 A1   Jun. 6, 2013

Related U.S. Application Data

(63) Continuation of application No. 13/177,100, filed on Jul. 6, 2011, now Pat. No. 8,379,417.

(51) Int. Cl.
*H02M 5/45* (2006.01)
*H01F 27/36* (2006.01)

(52) U.S. Cl.
USPC .......................... 363/37; 336/84 C

(58) Field of Classification Search
USPC ... 363/34–37, 39, 40, 44, 55, 123; 336/84 R, 336/84 C, 221
See application file for complete search history.

(56) References Cited

U.S. PATENT DOCUMENTS

| | | | |
|---|---|---|---|
| 3,745,440 A * | 7/1973 | Lord | 363/17 |
| 5,422,619 A | 6/1995 | Yamaguchi et al. | |
| 5,905,642 A | 5/1999 | Hammond | |
| 6,118,678 A | 9/2000 | Limpaecher et al. | |
| 6,507,176 B2 * | 1/2003 | Wittenbreder, Jr. | 323/259 |
| 6,617,814 B1 | 9/2003 | Wu et al. | |
| 6,819,070 B2 | 11/2004 | Kerkman et al. | |
| 6,867,564 B1 | 3/2005 | Wu et al. | |
| 6,987,372 B1 | 1/2006 | Wu et al. | |
| 7,034,501 B1 | 4/2006 | Thunes et al. | |
| 7,106,025 B1 | 9/2006 | Yin et al. | |
| 7,132,812 B1 | 11/2006 | Wu et al. | |
| 7,164,254 B2 * | 1/2007 | Kerkman et al. | 318/812 |
| 7,692,524 B2 | 4/2010 | Miller et al. | |
| 7,786,708 B2 | 8/2010 | Rozman et al. | |
| 8,174,856 B2 | 5/2012 | Chapman | |
| 8,379,417 B2 * | 2/2013 | Xiao et al. | 363/37 |
| 2008/0080106 A1 | 4/2008 | Mirafzal et al. | |
| 2011/0153234 A1 | 6/2011 | Winterhalter et al. | |
| 2011/0216564 A1 | 9/2011 | Swamy | |
| 2012/0081058 A1 | 4/2012 | Bortolus et al. | |
| 2012/0081061 A1 | 4/2012 | Zargari et al. | |
| 2012/0106210 A1 | 5/2012 | Xu et al. | |
| 2012/0201056 A1 | 8/2012 | Wei et al. | |
| 2012/0212982 A1 | 8/2012 | Wei et al. | |

* cited by examiner

*Primary Examiner* — Adolf Berhane
(74) *Attorney, Agent, or Firm* — Fay Sharpe LLP; Alexander Kuszewski; John M. Miller

(57) ABSTRACT

A power conversion system and a DC link choke therefore are presented, in which a continuous core structure is provided with first and second legs around which four or more windings are located, with one or more shunt structures providing a magnetic flux path between intermediate portions of the first and second legs.

20 Claims, 9 Drawing Sheets

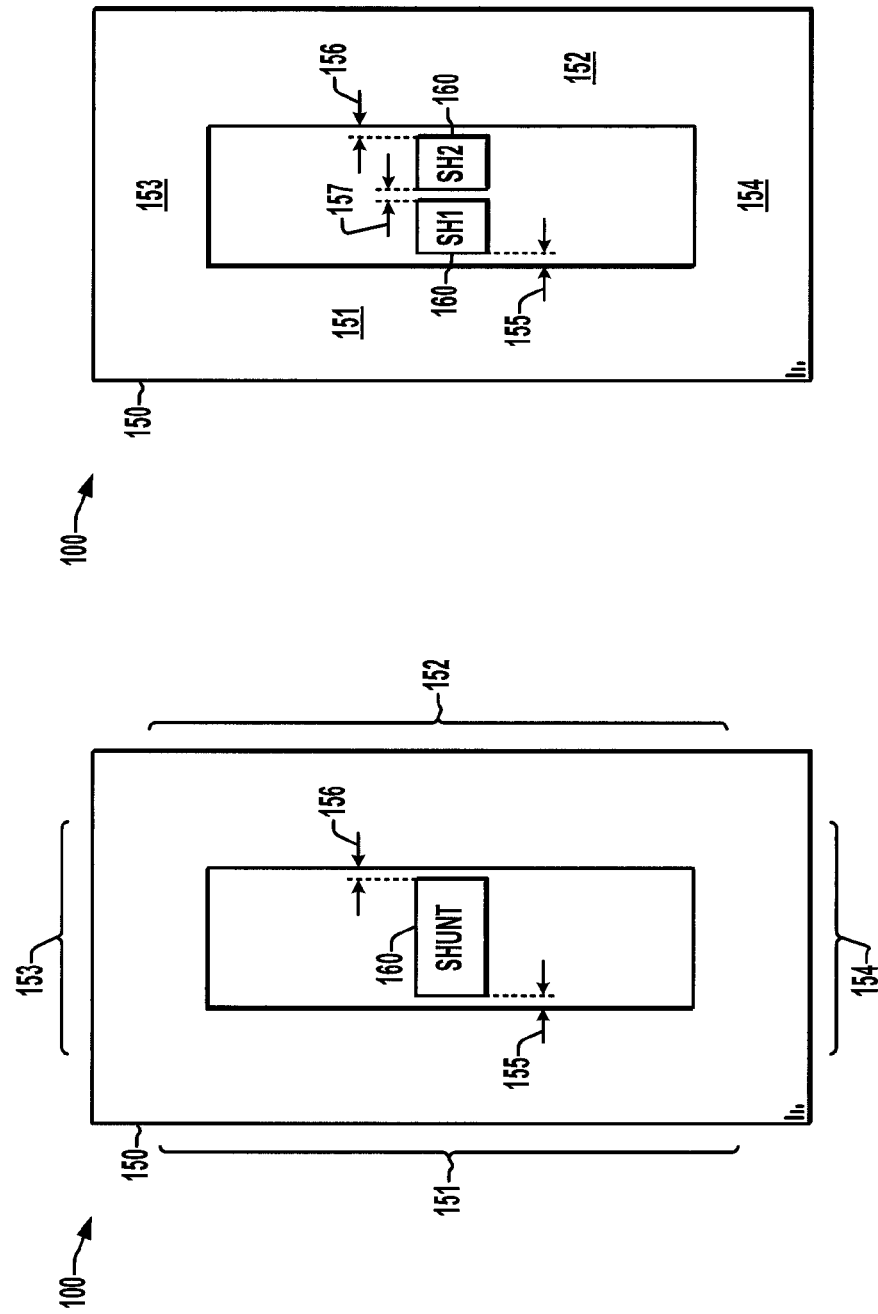

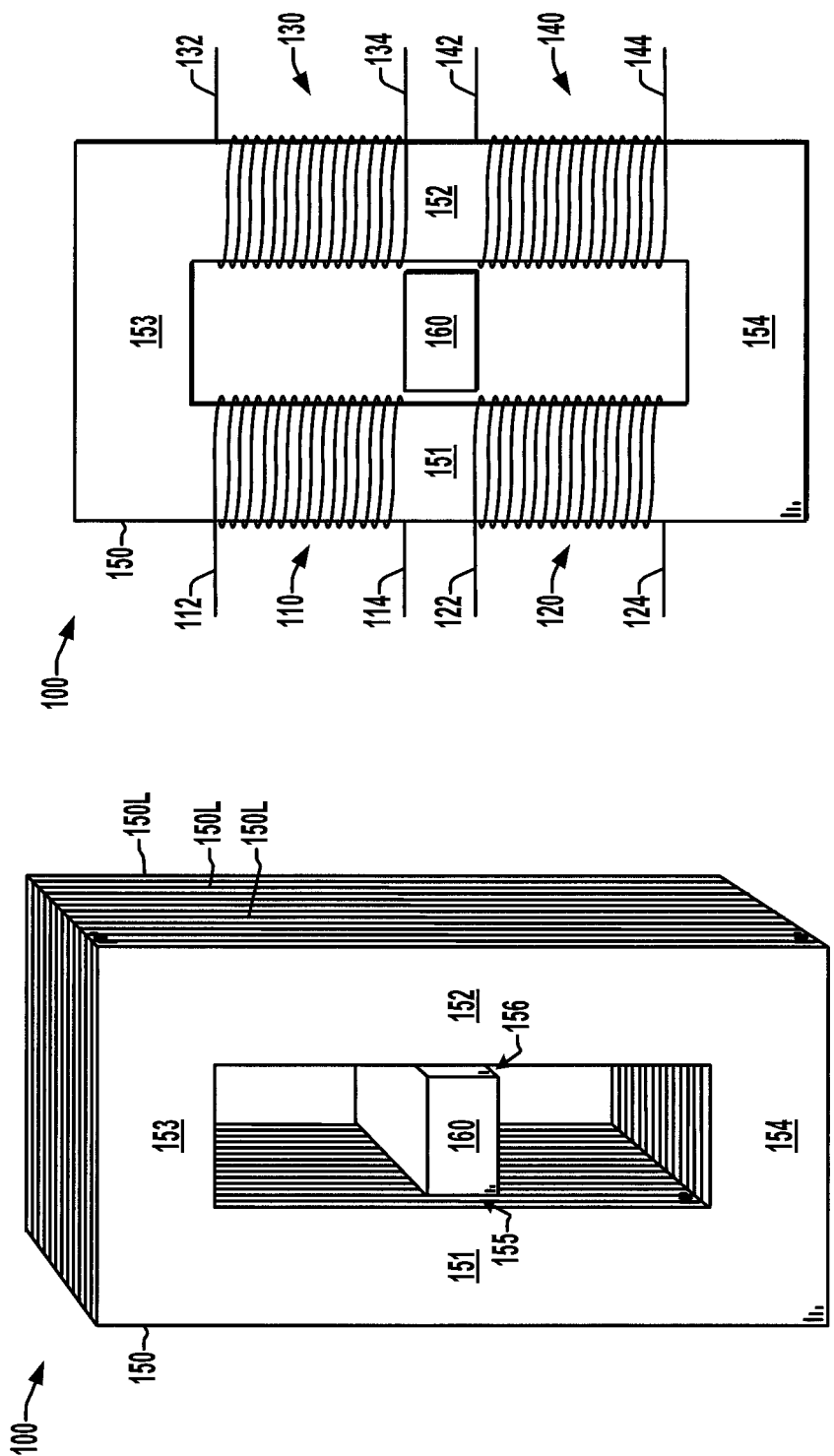

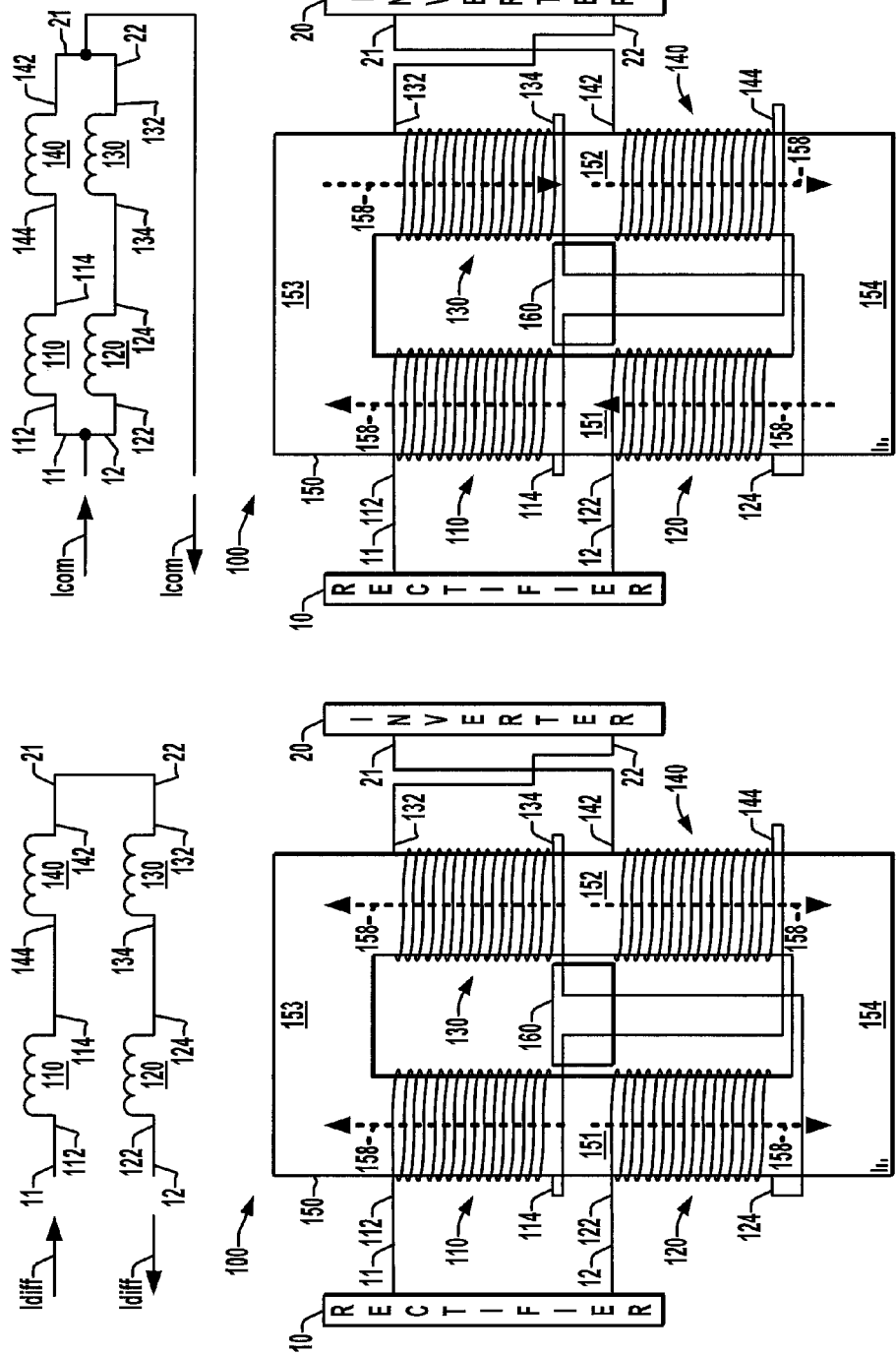

POWER CONVERTER AND INTEGRATED DC CHOKE THEREFOR

REFERENCE TO RELATED APPLICATION

This application is a continuation of, and claims priority to and the benefit of, U.S. patent application Ser. No. 13/177,100, filed on Jul. 6, 2011, entitled POWER CONVERTER AND INTEGRATED DC CHOKE THEREFOR, now U.S. Pat. No. 8,379,417. the entirety of which application is hereby incorporated by reference.

BACKGROUND

Motor drives and other power conversion systems convert electrical power from one form to another, and may be employed in a variety of applications such as powering an electric motor using power converted from a single or multiphase AC input source. One common form of motor drive is a current source converter (CSC), in which a rectifier converts input AC power from a single or multiphase AC input source to provide DC current to a DC link circuit. An output inverter converts the DC link current into single or multiphase AC output power to drive a motor load. Such power conversion systems may be subject to both differential and common mode voltages and currents, which can cause a variety of problems including degradation of the power conversion system and/or the motor load. For instance, motors are susceptible to damage or performance degradation caused by appearance of excessive common mode voltages on the motor leads. Previously, low and medium voltage converters often include differential mode inductors as well as common mode control apparatus to address these problems. However, separate differential and common mode devices are costly and occupy space in a power conversion system. Other techniques include modification of switching waveforms in one or both of the rectifier and inverter stages, but such techniques often require complicated switching control systems. Common mode and differential mode noise effects can also be addressed by using isolation transformers within the power conversion system, but these transformers add cost to the system and occupy space. Thus, there remains a need for improved common mode and differential mode suppression apparatus and techniques in power conversion systems.

U.S. Pat. No. 7,164,254 to Kerkman et al., issued Jan. 16, 2007 and assigned to the assignee of the present application discloses common mode voltage reduction techniques in which the switching sequence is modified to avoid using the zero vectors in order to reduce common mode voltages in the motor. The entirety of this patent is hereby incorporated by reference as if fully set forth herein.

U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein.

U.S. Pat. No. 5,422,619 to Yamaguchi et al., issued Jun. 6, 1995 discloses a common mode choke coil with a couple of U-shaped cores and 4 coils wound around legs of the cores, the entirety of which is hereby incorporated by reference as if fully set forth herein.

U.S. Pat. No. 5,905,642 to Hammond, issued May 18, 1999 discloses a common mode reactor between a DC converter and an AC converter to reduce common mode voltage from current source drives, the entirety of which is hereby incorporated by reference as if fully set forth herein.

U.S. Pat. No. 6,617,814 to Wu et al., issued Sep. 9, 2003 and assigned to the assignee of the present application discloses an integrated DC link choke and method for suppressing common-mode voltage and a motor drive, the entirety of which is hereby incorporated by reference as if fully set forth herein.

U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein.

U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure presents power conversion systems and DC chokes with a core structure including first and second legs having at least four windings and one or more shunts providing a magnetic flux path between intermediate portions of the first and second core legs.

A power conversion system is provided which includes a rectifier, an inverter and a DC link choke providing coils coupled between the rectifier and the inverter. The rectifier includes first and second DC output nodes, and the inverter has first and second DC input nodes. The link choke includes a core structure with first and second legs, both of which include two ends and an intermediate portion. A third leg extends between the first ends of the first and second legs, and a fourth leg extends between the second ends of the first and second legs. In certain embodiments, the core structure includes a plurality of laminates. In certain embodiments, moreover, the core structure has no gaps in or between the legs.

One or more shunts are provided between the intermediate portions of the first and second legs to provide a magnetic flux path between the intermediate portions, where a plurality of gaps are formed between the shunt(s) and the intermediate portions, wherein at least one of the gaps may be zero in certain embodiments. Four or more windings are provided, with a first winding forming a first coil of the DC choke and having first and second terminals, with the first winding forming at least one turn around the first leg between the intermediate portion and the first end of the first leg. A second winding forms at least one turn between the intermediate portion and the second end of the first leg. In addition, a third winding forms at least one turn between the intermediate portion and the first end of the second leg, and a fourth winding forms at least one turn between the intermediate portion and the second end of the second leg.

In certain embodiments, two or more shunts are provided in the magnetic flux path between the intermediate portions of the first and second legs, where the shunts extend between the intermediate portions and form at least one additional gaps between the at least two shunts.

In certain embodiments, the first and third windings are coupled in series between the first DC output node of the rectifier and the first DC input node of the inverter, and the second and fourth windings are coupled in series with one another between the second rectifier DC output node and the second inverter DC input node.

In other embodiments, the first and second windings are coupled between the first rectifier DC output node and the first inverter DC input node, with the third and fourth windings being coupled in series between the second rectifier DC output node and the second inverter DC input node.

In further embodiments, the first and fourth windings are coupled between the first rectifier DC output node and the first inverter DC input node, and the second and third windings are coupled between the second rectifier DC output node and the second inverter DC input node.

In accordance with further aspects of the disclosure, an integrated DC link choke is provided, which is comprised of a core structure with four legs including a first leg having two ends and an intermediate portion disposed therebetween as well as a second leg with two ends and an intermediate portion. A third leg of the core structure extends between the first ends of the first and second legs, and a fourth leg extends between the second ends of the first and second legs. One or more shunts are provided which extend between the intermediate portions of the first and second legs to provide a magnetic flux path therebetween, and a plurality of gaps is formed between the intermediate portions of the first and second legs and the shunt(s). The choke further comprises four or more windings, including a first winding with first and second terminals and forming at least one turn around the first leg between the intermediate portion and the first end of the first leg. A second winding is provided which forms at least one turn between the intermediate portion and the second end of the first leg. A third winding is provided which forms at least one turn between the intermediate portion and the first end of the second leg, and a fourth winding forms at least one turn between the intermediate portion and the second end of the second leg. In certain embodiments, more than one gap is provided between the intermediate portions of the first and second legs, and at least one additional gap is formed between the shunts. In certain embodiments, moreover, the core structure includes a plurality of laminates. In addition, the core structure in certain embodiments is a continuous structure having no gaps in or between the legs. In certain embodiments, the first and third windings are coupled in series with one another, and the second and fourth windings are coupled in series with one another. In other embodiments, the first and second windings are coupled in series with one another, and the third and fourth windings are coupled in series with one another. In still other embodiments, the first and fourth windings are coupled in series with one another, and the second and third windings are coupled in series with one another.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 2 is a front elevation view illustrating an exemplary core structure for the integrated DC link choke, including a single shunt disposed between intermediate portions of first and second vertical core legs;

FIG. 3 is a front elevation view illustrating another exemplary DC link choke core structure having two shunts disposed between the vertical core legs;

FIG. 4 is a front perspective view illustrating a laminated DC link choke core structure with a single shunt extending between the vertical core legs;

FIG. 5 is a simplified front elevation view illustrating an exemplary DC link choke with first, second, third, and fourth windings located on the vertical core legs;

FIG. 13 is a front elevation view illustrating connection of the DC link choke in the system of FIG. 12, as well as a differential mode equivalent circuit and corresponding magnetic flux paths in the choke core structure; and FIG. 14 is a front elevation view illustrating the DC link choke in the system of FIG. 12, with a common mode equivalent circuit and corresponding magnetic flux paths in the link choke core structure.

DETAILED DESCRIPTION

Figure 1:
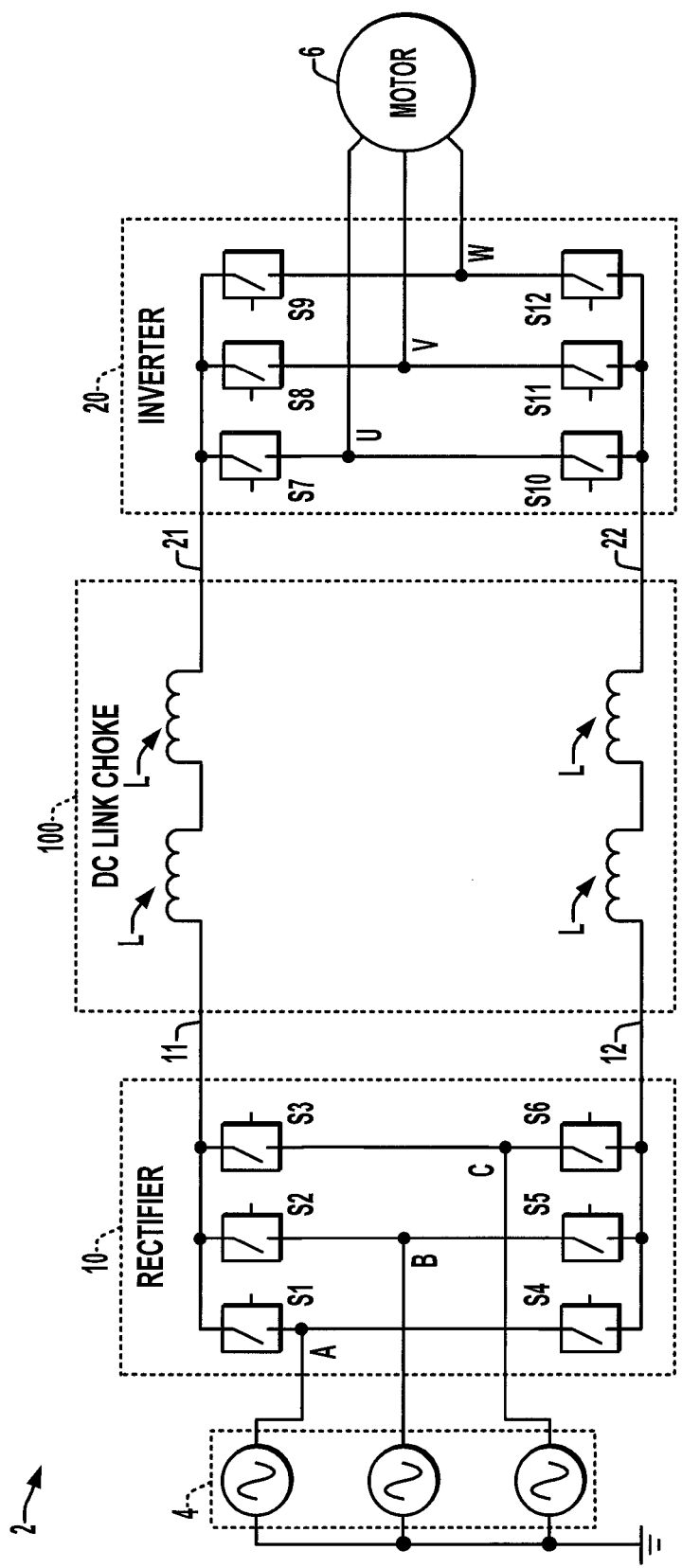
FIG. 1 is a schematic diagram illustrating an exemplary current source converter type variable frequency motor drive power conversion system with an integrated DC link choke according to one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

The inventors have appreciated that existing common mode choke designs suffer from various issues and problems.

Inherent weaknesses of these devices include the difficulty in avoiding the influence of local saturation on common mode inductance. Moreover, windings in these conventional devices with large numbers of turns can increase the proximity losses significantly. In this regard, common mode chokes have thus far been difficult to design due to complexities in calculating or simulating flux distribution.

The disclosed embodiments provide a single link choke integrating differential mode inductors and common mode voltage suppression. These embodiments find utility in association with any form of power conversion system, such as low-voltage and medium voltage motor drive type power converters, and can be advantageously employed in transformerless configurations. Use of a single integrated link choke in an intermediate DC circuit reduces the total component count for motor drives and other power conversion systems compared with conventional solutions based on separate differential and common mode devices, and the illustrated winding arrangements facilitate reduction in core material cost and size as well as copper loss, with the shared cross-sectional area reducing the overall choke core weight. The disclosed approach can be used to provide a reliable cost-effective solution to common mode voltage problems in power converter systems, potentially without the need for active solutions and the associated complex control requirements.

FIG. 1 illustrates an exemplary current source converter type variable frequency motor drive power conversion system 2 that includes an input rectifier 10 receiving single or multiphase AC input power from a power source 4, as well as an inverter 20 providing single or multiphase AC output electrical power to drive a motor or other load 6. A link choke 100 is provided which couples a DC output of the rectifier 10 with a DC input of the inverter 20. In the illustrated embodiments, the DC link choke 100 couples the rectifier 10 and inverter 20 of a single power conversion system 2. However, other embodiments are possible in which additional windings are added to a DC choke 100 to accommodate coupling between inverters 20 and rectifiers 10 of multiple power conversion systems 2, with such windings providing coils to the respective power conversion systems 24 controlling and/or otherwise addressing differential and common mode issues.

The rectifier 10 may be an active or passive rectifier circuit, including one or more passive diodes for rectifying AC input power to provide DC output power. In other implementations, an active rectifier may be used, including a plurality of switches (e.g., SGCTs, IGCTs, GTOs, thyristors, IGBTs with reverse blocking capability, etc.) operable according to corresponding control signals from a rectifier control system (not shown) for selectively creating an intermediate DC link current flowing in first and second rectifier DC output terminals or nodes 11 and 12, respectively. The illustrated rectifier 10, moreover, is a three-phase active rectifier having six switching devices S1-S6 individually coupled between one of the corresponding three input phase lines A, B, C and one of the DC output terminals 11, 12, where the switching devices S1-S6 are individually operable according to a corresponding switching control input signal (not shown). In operation, the rectifier 10 provides a regulated DC link current to the choke 100 via one or both of the nodes 11, 12, where the example of FIG. 1 includes four coils L, with two coils L coupled in series with one another between the upper rectifier DC output terminal 11 and an the upper inverter DC input terminal 21, as well as another two coils L coupled in series with one another between a lower (e.g., second) rectifier DC output terminal 12 and a lower inverter DC input terminal 22. In general, DC output current flows from the rectifier 10 through the first output terminal 11 into the link choke 100, and current is provided from the link choke via the first inverter DC input terminal or node 21 for conversion by the inverter 20 into single or multiphase AC electrical output power to drive a motor 6 or other load. The lower DC link path provides a return current path for DC current flowing from the inverter 20 via the second DC input terminal or node 22 through the link choke 100 and returning to the rectifier 10 via the second rectifier DC output terminal or node 12. The system 2 may include suitable controls (not shown) for operating the rectifier switching devices S1-S6, and may include feedback another regulation components (not shown) by which the DC link current can be measured to provide feedback for regulation of the DC current produced by the rectifier 10.

The inverter 20 in the illustrated example is a three-phase system which receives DC input current via the nodes 21 and 22, which are connected to an array of inverter switching devices S7-S12 (e.g., SGCTs, IGCTs, GTOs, thyristors, IGBTs, etc.) which are selectively operated according to corresponding switching control input signals from an inverter controller (not shown) to selectively couple individual ones of the three-phase output lines U, V, W with one of the DC input nodes 21, 22 according to any suitable switching control technique (e.g., such as space vector modulation (SVM), selective harmonic elimination (SHE), etc.). By this operation, the DC link current received at the DC input node 21 by way of the link choke 100 from the rectifier 10 is selectively converted into multiphase AC output currents to drive the motor load 6. In other possible embodiments, a single-phase inverter 20 may be used to drive a load 6. Moreover, the system 2 may be used to drive other forms of loads, and the disclosed concepts are not limited to motor drives.

The DC link choke 100 forms an intermediate circuit that links the switches S1-S6 of the rectifier 10 with the DC input nodes 21, 22 of the inverter 20. In certain embodiments, two coils L are provided in each of the upper and lower branches of the intermediate linking circuit, and some embodiments are possible in which coils L of the choke 100 are provided in only one of the upper and lower DC branches. Further implementations are possible in which only a single coil L is provided in one of the linking circuit branches, with three or more coils L being coupled in the other branch. Moreover, while the illustrated embodiments include four windings 110-140, more than four such windings can be provided on a DC link choke 100 according to the present disclosure. The power conversion system 2 may include further components (not shown) such as input and/or output filter circuits including inductors and/or capacitors, various feedback circuits to facilitate control of the DC link current and/or control of the output current provided to the motor 6, various user interface components to facilitate operation of the system 2 generally or specific portions thereof, etc., the details of which are omitted in order not to obscure the novel aspects of the present disclosure.

Referring also to FIGS. 2-5, the DC choke 100 is constructed using a core structure 150, which can be fabricated using any suitable inductor or transformer core material. As shown in FIG. 4, moreover, the core structure 150 in certain embodiments is constructed using two or more laminates 150L, which can be coated or uncoated and can be held together as a single core structure using any suitable techniques. FIG. 2 illustrates an exemplary front view of the core structure 150, which includes first and second vertical legs 151 and 152, respectively, each of which having an upper first end and a lower second end. The structure 150 also includes a horizontally disposed third leg 153 extending between the first (upper) ends of the first and second legs 151 and 152, as well as a horizontal fourth leg 154 extending between the second (lower) ends of the first and second legs 151 and 152. In certain embodiments, the illustrated structure 150 shown in FIG. 2 may be replicated as two or more laminates 150L as shown in FIG. 4, or a single unitary structure 150 may be provided. In addition, the exemplary core structure 150 has no gaps in or between the legs 151-154, although other embodiments are possible in which an air gap (or gap filled with other material) is provided in or between some or all of the legs 151-154 or in which multiple air gaps are provided (not shown).

As seen in FIGS. 2 and 3, one or more shunts 160 are included in the link choke 100 in order to provide a magnetic flux path between intermediate portions of the first and second legs 151 and 152. The shunt or shunts 160 may be constructed of any suitable material such as the same core material used to make the core structure 150. In the example of FIG. 2, a single shunt 160 is disposed between the intermediate portions of the vertical core legs 151 and 152, where the shunt 160 is spaced from the legs 151 and 152, thereby defining first and second gaps 155 and 156, respectively. In certain embodiments, the gaps 155 and 156 may be equal, or these gaps 155, 156 may be different. Moreover, in certain examples, one of the gaps 155, 156 may be zero, with the corresponding end of the shunt 160 contacting the corresponding leg 151, 152 of the core structure 150. In various embodiments, more than one shunt 160 may be used. FIG. 3 illustrates one such example in which two shunts 160 are provided in the magnetic flux path between the intermediate portions of the vertical legs 151 and 152. As seen in FIG. 3, the shunts 160 extend between, and are spaced from, the intermediate portions of the legs 151 and 152, and the shunts 160 are also spaced from one another to form an additional gap 157 therebetween.

FIG. 5 shows the integrated DC choke 100 (for the case in which a single shunt 160 is used), including four exemplary windings 110, 120, 130 and 140 provided on the first and second legs 151, 152, each of which forms a coil L coupled between the rectifier DC output and the inverter DC input. The first winding 110 includes a first terminal 112 and a second terminal 114 and forms one or more turns around the first leg 151 between the intermediate portion thereof and the first (e.g., upper) end of the leg 151, where the beginning of the winding 110 starting from the first terminal 112 crosses in front of the upper portion of the first leg 151 and the turns continue downward with the final portion of the winding 110 crossing behind the leg 151 and ending at the second terminal 114. In this manner, current flowing into the first terminal 112 and out of the second terminal 114 will cause flux within the upper portion of the first leg 151 in the upward direction shown in FIG. 5. The second winding 120 has a first terminal 122 and a second terminal 124 and forms at least one turn around the first leg 151 between the intermediate portion and the second (e.g., lower) end of the first leg 151. As with the first winding 110, the beginning of the second winding 120 starting from the terminal 122 passes in front of the first leg 151 and the winding turns proceed downward to a final portion passing behind the leg 151 and ending at the second terminal 124. Thus, current flowing into the first terminal 122 and flowing out of the second terminal 124 will create a flux in the upward direction in the lower part of the first leg 151.

The third and fourth windings 130 and 140 are wound around the second core leg 152 as seen in FIG. 5. In the embodiment of FIG. 5, the third winding 130 has a first terminal 132 and a second terminal 134, and this winding 130 forms at least one turn around the second leg 152 between the intermediate portion thereof and the first (upper) end of the second leg 152. In this configuration, the beginning of the winding 130 begins at the terminal 132 and passes behind the leg 152, extending downward therefrom toward the intermediate portion, with the final portion of the winding 130 passing in front of the leg 152 and ending with the second terminal 134. Thus, current flowing into the first terminal 132 and out of the second terminal 134 will create flux in the upward direction in the upper portion of the second leg 152. The fourth winding 140 has a first terminal 142 and a second terminal 144, with the beginning of the winding 140 passing from the first terminal 142 behind the leg 152 and extending downward toward the second (lower) end of the leg 152 with the final portion of the winding 140 passing in front of the leg 152 and ending at the second terminal 144. In this configuration, current flowing into the first terminal 142 and out of the second terminal 144 creates upward flux in the lower portion of the second leg 152 of the core structure 150.

In certain embodiments, the number of turns in each of the windings 110, 120, 130 and 140 are the same, and the first and second legs 151 and 152 of the core structure 150 are generally of the same size, shape, and material, whereby the inductances L associated with these windings 120-140 are generally equal. In other embodiments, one or more of these design parameters may be varied for individual ones of the windings 110, 120, 130 and/or 140 whereby the coils L associated with the individual windings 110-140 may be different. Moreover, as seen below, the interconnection of the windings 110-140 within a given power conversion system to may be adjusted along with design parameters related to the DC link choke 100 itself in order to provide a variety of different combinations of inductance with respect to common mode voltages, differential mode currents, etc.

Figure 6:
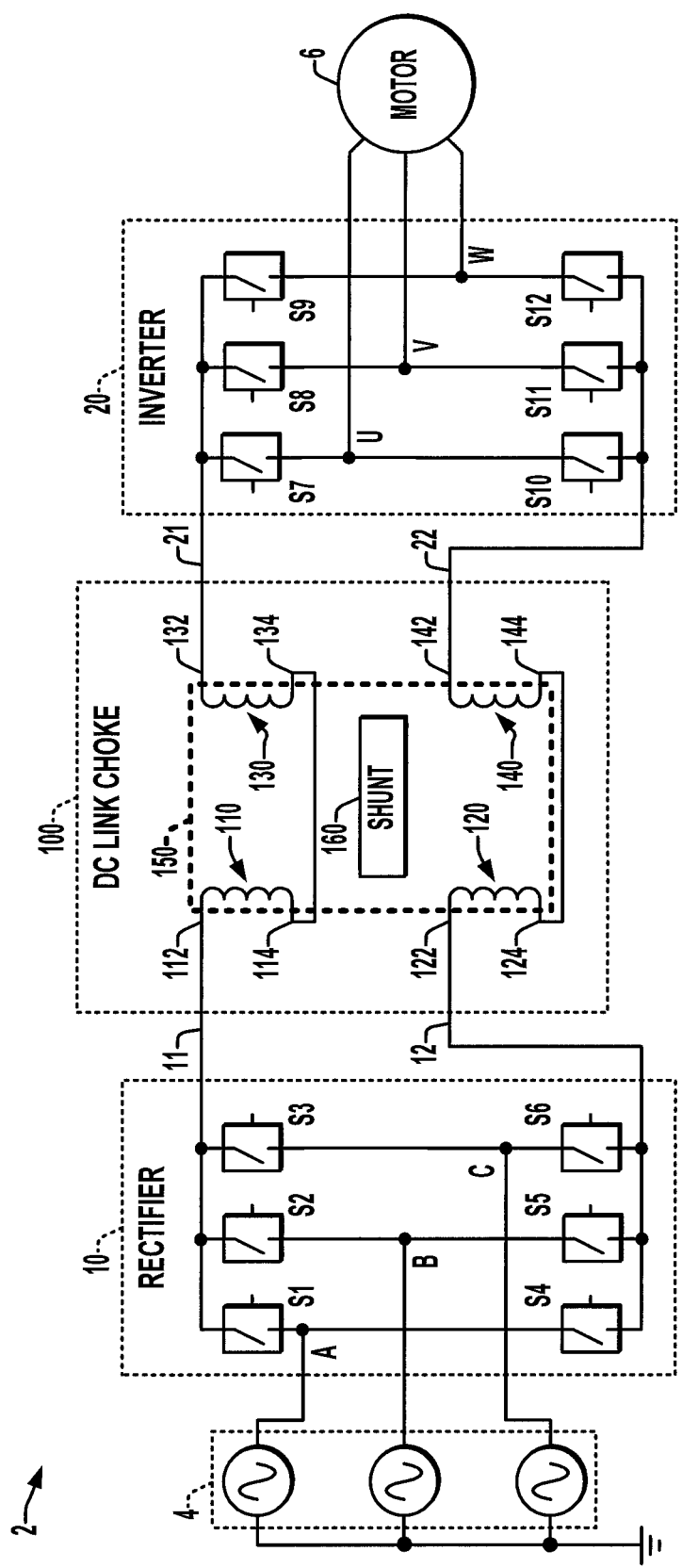
FIG. 6 is a schematic diagram illustrating an exemplary power conversion system with an integrated DC link choke in which the first and third windings are connected in an upper DC link current path and the second and fourth windings are connected in a lower DC link path.
Figures 7, 8:
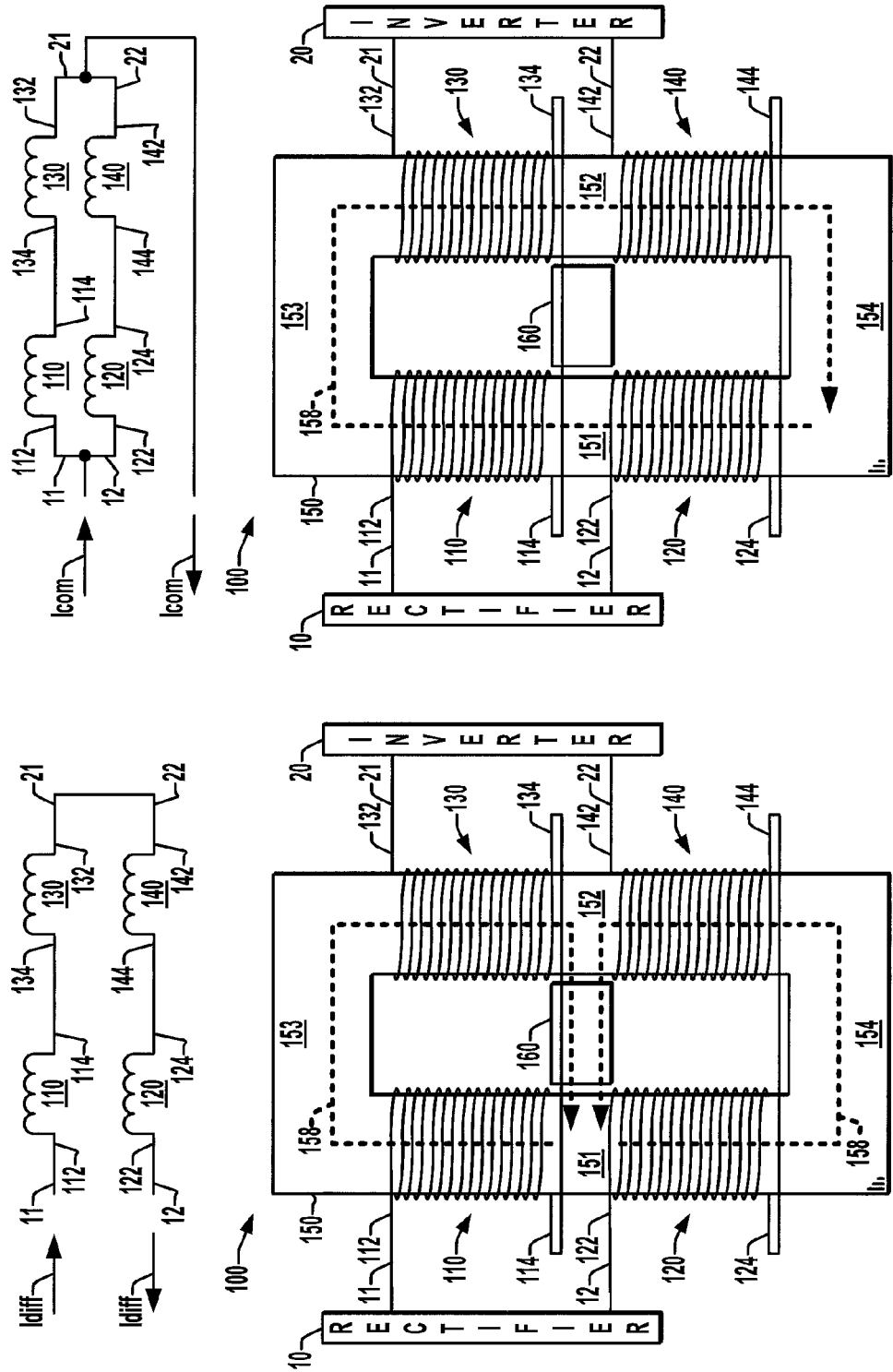
FIG. 7 is a front elevation view illustrating connection of the DC link choke in the system of FIG. 6, as well as a differential mode equivalent circuit and corresponding magnetic flux paths in the link choke core structure.
FIG. 8 is a front elevation view illustrating the DC link choke in the system of FIG. 6 along with a common mode equivalent circuit and corresponding magnetic flux paths in the link choke core structure.

Referring now to FIGS. 6-8, FIG. 6 illustrates an exemplary embodiment of the power conversion system 2 with an integrated DC link choke 100 in which the first and third windings 110 and 130 are connected in the upper DC link current path of the converter 2, and the second and fourth windings 120 and 140 are connected in the lower DC link path. This embodiment, like the others illustrated in the subsequent figures, may include a single shunt 160 or may be provided with two or more shunts 160 (e.g., as seen in FIG. 3 above). In the configuration of FIGS. 6-8, the windings 110 and 130 are coupled in series with one another between the first DC output node 11 of the rectifier 10 and the first DC input node 21 of the inverter 20. In addition, the second and fourth windings 120 and 140 are coupled in series with one another between the second DC output node 12 of the rectifier 10 and the second DC input node 22 of the inverter 20. FIGS. 7 and 8 show front views of the DC link choke 100 in the system of FIG. 6, along with differential and common mode equivalent circuits, and the corresponding magnetic flux paths are illustrated in the link choke core structure 150. As seen in FIGS. 6-8, the first terminal 112 of the first winding 110 is coupled with the first rectifier DC output node 11, the second terminal 114 of the first winding 110 is coupled with the second terminal 134 of the third winding 130, and the first terminal 132 of the third winding 130 is coupled with the first inverter DC input node 21. In this manner, the windings 110 and 130 and the coils L thereof are connected in series in the upper DC link branch between the rectifier 10 and the inverter 20. In addition, the first terminal 122 of the second winding 120 is coupled with the second DC output node 12 of the rectifier 10, the second terminal 124 of the winding 120 is coupled with the second winding 144 of the fourth winding 140, and the first terminal of the winding 140 is coupled with the second inverter DC input node 22. Thus, the second and fourth windings 120 and 140 in the coils L thereof are coupled in series with one another in the lower DC link branch.

FIG. 7 illustrates operation of the DC choke 100 with respect to differential current flow Idiff, and the figure includes an equivalent circuit through which the differential current flows from the first DC output terminal 11 of the rectifier 10 into the first terminal 112 of the winding 110, then into the second terminal 134 of the third winding 130, after which the differential current flows into the first terminal 142 of the fourth winding 140 and then into the second terminal 124 of the second coil 120, finally flowing back through the second DC output terminal 12 of the rectifier 10. For such differential current Idiff, flux paths 158 are created in the core structure 150 as shown in the bottom portion of FIG. 7, with magnetic flux flowing from right to left through the magnetic flux path created between the intermediate portions of the legs 151 and 152, the shunt 160, and the associated gaps (e.g., gaps 155 and 156 as illustrated in FIGS. 2 and 4 above).

FIG. 8 illustrates this embodiment with respect to common mode current Icom flowing in the converter 2, where the upper portion of the figure shows the equivalent circuit for this common mode situation. As illustrated, the common mode circuit is the parallel combination of two series branches, with the first (upper) branch including the series combination of the first and third windings 110 and 130, and with the second (lower) branch including the series combination of the second and fourth windings 120 and 140. In this case, with the inductances being equal, half the common mode current Icom flows in each of these circuit branches, and the lower portion of FIG. 8 illustrates the resulting magnetic flux flow within the core structure 150 (e.g., clockwise in the figure flowing through the core legs 151, 153, 152, and 154 sequentially). It is noted, that some magnetic flux may pass through the intermediate path that includes the shunt 160, although not a strict requirement of the present disclosure. As seen in FIGS. 7 and 8, the integrated DC link choke 100 may thus provide different levels of effective inductance with respect to differential mode current flow Idiff and common mode current Icom.

Figure 9:
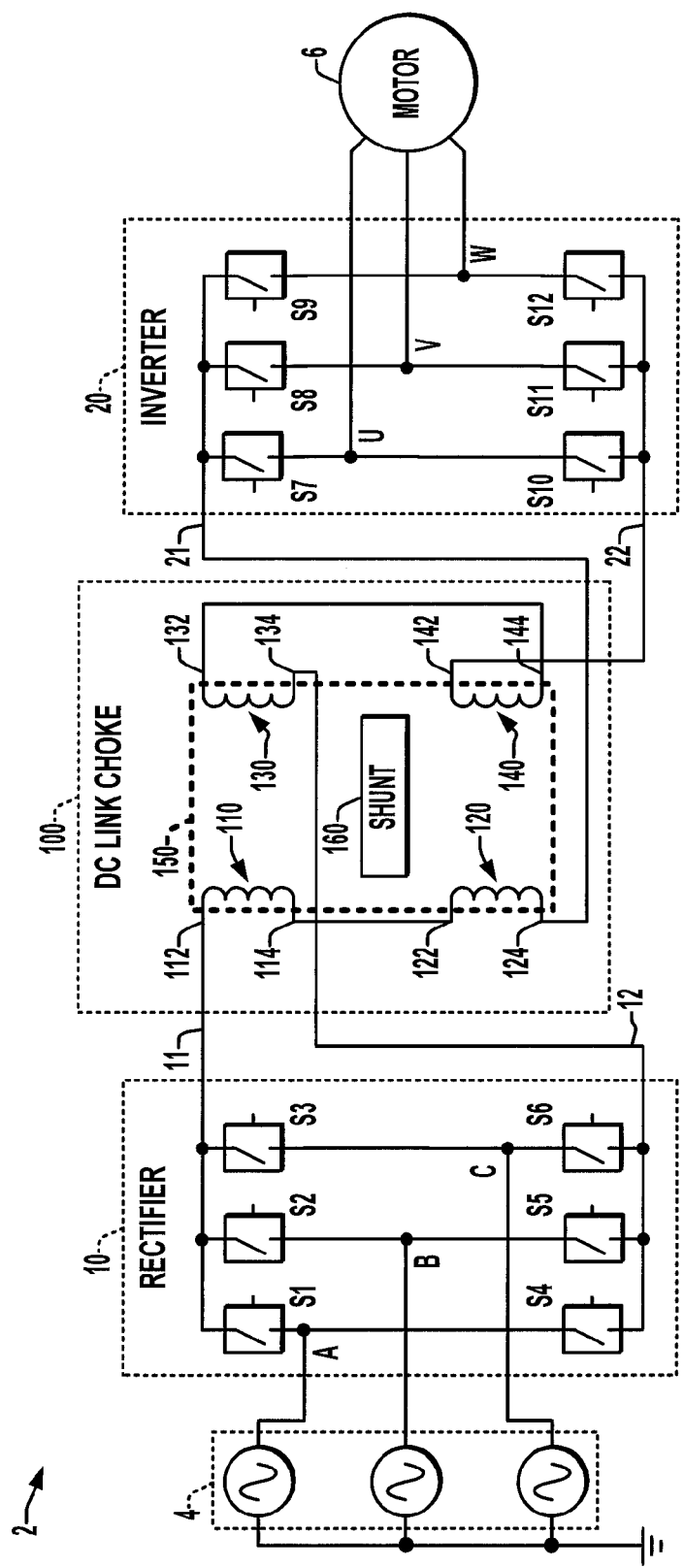
FIG. 9 is a schematic diagram illustrating another motor drive power conversion system embodiment including an integrated DC link choke with the first and second windings connected in the upper DC link current path as well as the third and fourth windings connected in the lower DC link path.
Figures 10, 11:
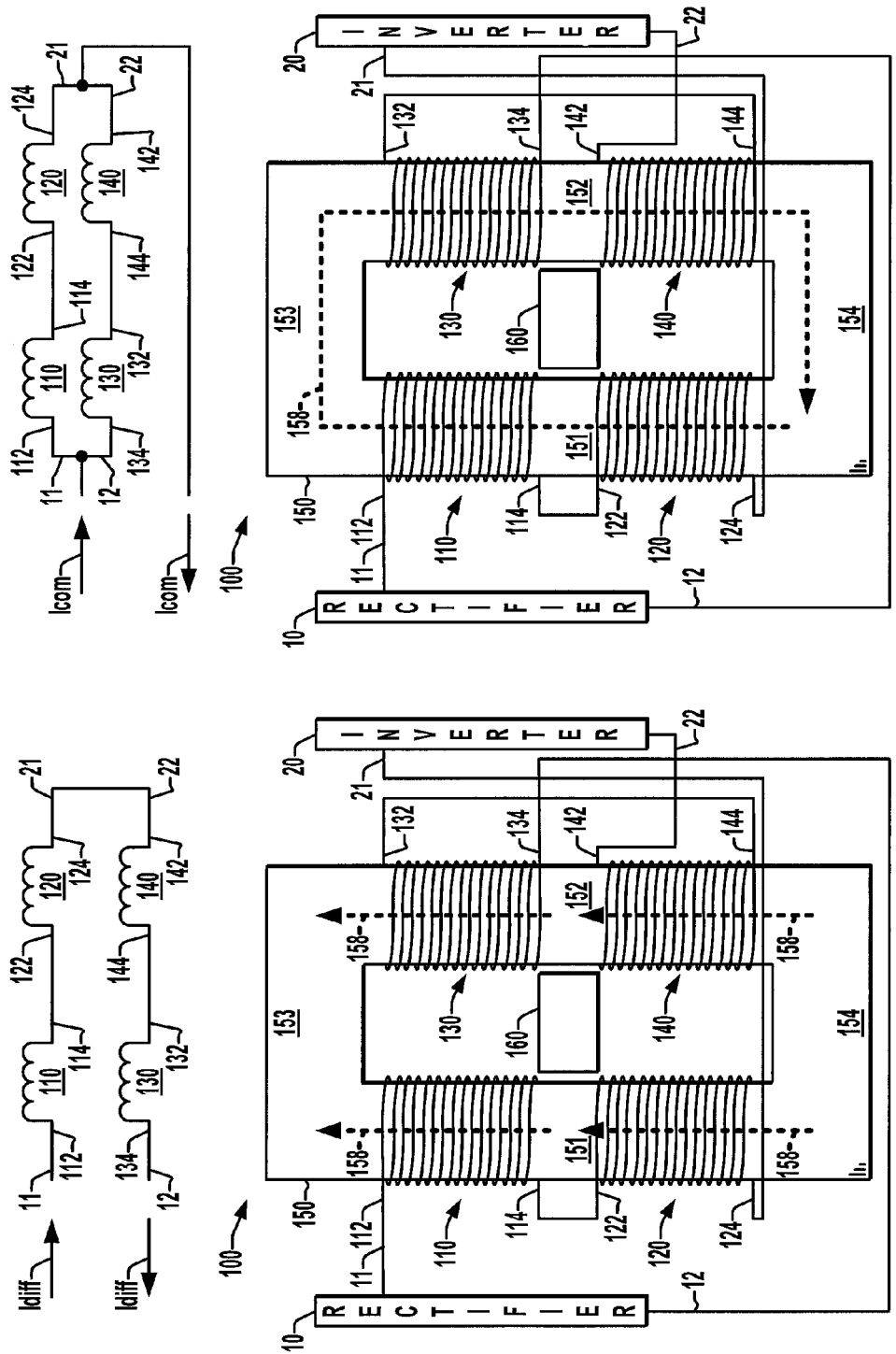
FIG. 10 is a front elevation view illustrating connection of the DC link choke in the system of FIG. 9 and a differential mode equivalent circuit and corresponding magnetic flux paths in the link choke core structure.
FIG. 11 is a front elevation view illustrating connection of the DC link choke in the system of FIG. 9, as well as a common mode equivalent circuit and corresponding magnetic flux paths in the link choke core structure.

FIGS. 9-11 illustrate another embodiment of the current source converter motor drive 2 in which the integrated DC link choke 100 has the first and second windings 110 and 120 connected in the upper DC link current path, along with the third and fourth windings 130 and 140 connected in the lower DC link path. In this embodiment, the first terminal 112 of the winding 110 is coupled with the first rectifier DC output node 11, the second terminal 114 of the winding 110 is coupled with the first terminal 122 of the second winding 120, with the second terminal 124 of the winding 120 being coupled with the first inverter DC input node 21. In addition, the second terminal 134 of the third winding 130 is coupled with the second rectifier DC output node 12, the first terminal 132 of the winding 130 is coupled with the second terminal 144 of the fourth winding 140, and the first terminal 142 of the fourth winding 140 is coupled with the second inverter DC input node 22.

As seen in FIG. 10, the equivalent circuit with respect to differential current Idiff begins with the first rectifier output terminal 11 continuing into the first terminal 112 of the winding 110, and then into the first terminal 122 of the second winding 120. The differential current Idiff continues through the inverter 22 to the first terminal 142 of coil 140, and then into the first terminal 132 of the third winding 130, returning to the rectifier 10 via the second output terminal 12. This differential current flow in the DC link choke 100 creates magnetic flux paths 158 as shown in the lower portion of FIG. 10 (e.g., upward in both the vertical legs 151 and 152).

FIG. 11 illustrates the common mode situation, where the equivalent circuit (upper portion of FIG. 11) includes the parallel combination of 2 series circuit branches, where the first branch includes the windings 110 and 120, and the second branch includes the windings 130 and 140, with half the common mode current Icom flowing through each of these branch circuits in some embodiments. This common mode current flow Icom causes magnetic flux to flow in the path directions 158 indicated in the lower portion of FIG. 11. Thus, the variation in the interconnection of the windings 110-140 can be used (alone or in combination with other choke design parameters) to separately tailor the common mode and/or differential mode inductance provided by the choke 100.

Figure 12:
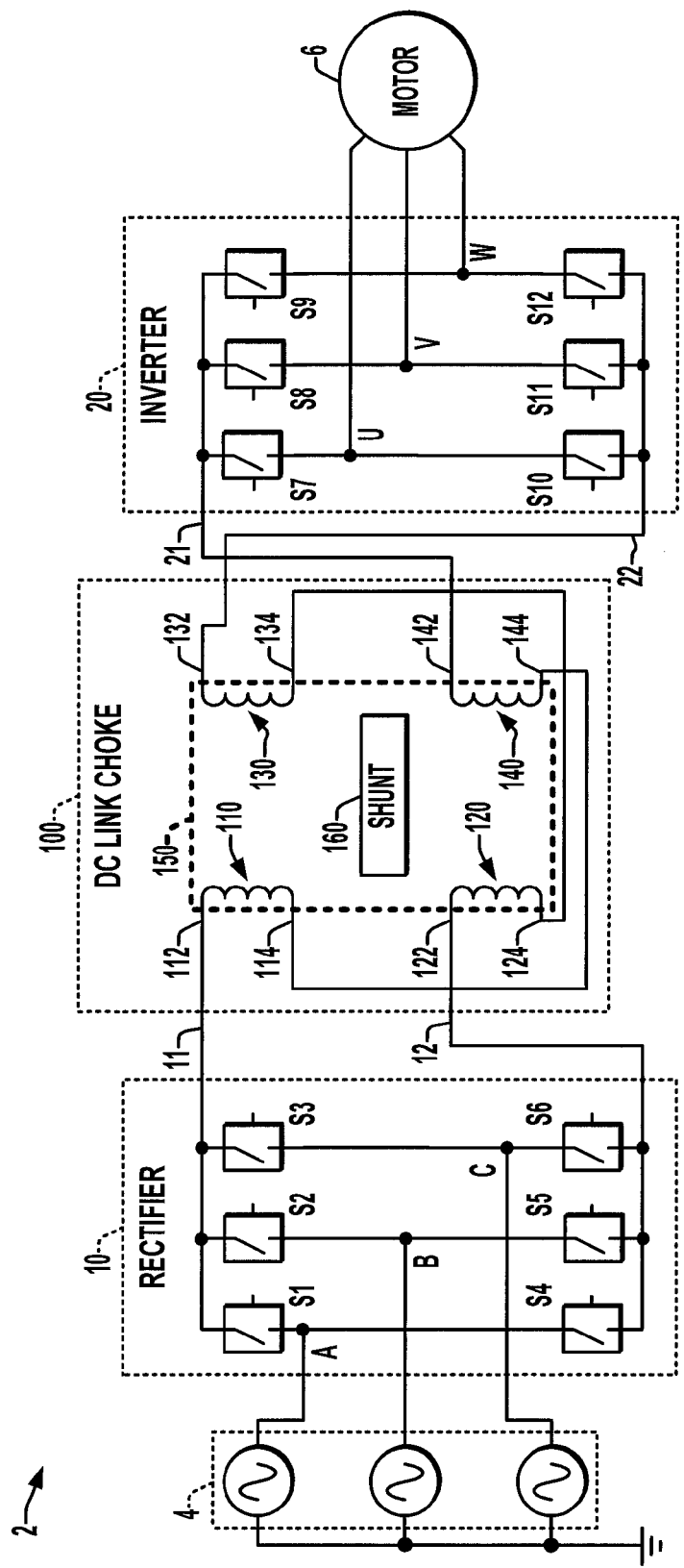
FIG. 12 is a schematic diagram illustrating another power conversion system embodiment with the first and fourth DC link choke windings connected in the upper DC link current path and the second and third windings connected in the lower DC link path.

FIGS. 12-14 illustrate yet another embodiment of the power conversion system 2, in which the first and fourth DC link choke windings 110 and 140 are connected in series with one another in the upper DC link current path, and the second and third windings 120 and 130 are connected in the lower DC link path. This cross-connection of the windings 110-140 provides different flux path directions as seen in FIGS. 13 and 14. The first terminal 112 of the first winding 110 in this embodiment is coupled with the first rectifier DC output node 11, and the second terminal 114 of the winding 110 is coupled with the second terminal 144 of the fourth winding 140. The first terminal 142 of the fourth winding 140, in turn, is coupled with the first inverter DC input node 21. The second DC output node 12 of the rectifier 10 is coupled with the first terminal 120 of the second winding 120, the second terminal 124 of the winding 120 is coupled with the second terminal 134 of the third winding 130, and the first terminal 132 of the winding 130 is coupled with the second inverter DC input node 22.

As seen in FIG. 13 for differential mode current Idiff, current flowing out of the first rectifier node 11 into the first terminal 112 of the winding 110 proceeds into the second terminal 144 of winding 140, and proceeds from the first terminal 142 of the winding 140 through the inverter 20 into the first terminal 132 of the third winding 130, and thereafter into the second terminal 124 of the second winding 120, returning to the rectifier 10 via the second DC output node 12. This causes magnetic flux 158 to flow upward in the upper portions of the core legs 151 and 152 (resulting from the current flow through the coils 110 and 130, respectively), and flux flows downward in the lower portions of the legs 151 and 152 as a result of the current flow through the second and fourth coils 120 and 140.

The common mode operation is illustrated in FIG. 14, in which common mode current Icom flows through the parallel combination of two branch circuits, with the first branch circuit including the first and fourth coils 110 and 140 and the second branch circuit including the coils 120 and 130 as shown in the upper portion of the figure. As seen in the lower portion of FIG. 14, this results in upward magnetic flux flow in the first core leg 151 and downward magnetic flux flow 158 in the second core leg 152.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a rectifier operative to provide DC output power at a rectifier DC output;
   an inverter comprising an inverter DC input, and operative to provide AC output power to a load; and
   a DC link choke comprising at least four coils coupled between the rectifier DC output and the inverter DC input, the DC link choke comprising:
      a core structure comprising: a first leg including first and second ends and an intermediate portion disposed between the first and second ends, a second leg including first and second ends and an intermediate portion disposed between the first and second ends, a third leg extending between the first ends of the first and second legs, and a fourth leg extending between the second ends of the first and second legs,
      at least one shunt providing a magnetic flux path between the intermediate portions of the first and second legs,
      a first winding forming a first coil coupled between the rectifier DC output and the inverter DC input, the first winding forming at least one turn around the first leg between the intermediate portion and the first end of the first leg,
      a second winding forming a second coil coupled between the rectifier DC output and the inverter DC input, the second winding forming at least one turn around the first leg between the intermediate portion and the second end of the first leg,
      a third winding forming a third coil coupled between the rectifier DC output and the inverter DC input, the third winding forming at least one turn around the second leg between the intermediate portion and the first end of the second leg, and
      a fourth winding forming a fourth coil coupled between the rectifier DC output and the inverter DC input, the fourth winding forming at least one turn around the second leg between the intermediate portion and the second end of the second leg.

2. The power conversion system of claim 1, comprising at least two shunts providing the magnetic flux path between intermediate portions of the first and second legs.

3. The power conversion system of claim 1, wherein the core structure comprises a plurality of laminates.

4. The power conversion system of claim 1, wherein the core structure has no gaps in or between the legs.

5. The power conversion system of claim 1, wherein the first winding and the third winding are coupled in series with one another between a first DC output node of the rectifier and a first DC input node of the inverter, and wherein the second winding and the fourth winding are coupled in series with one another between a second DC output node of the rectifier and a second DC input node of the inverter.

6. The power conversion system of claim 5, wherein a first terminal of the first winding is coupled with the first DC output node of the rectifier, a second terminal of the first winding is coupled with a second terminal of the third winding, a first terminal of the third winding is coupled with the first DC input node of the inverter, a first terminal of the second winding is coupled with the second DC output node of the rectifier, a second terminal of the second winding is coupled with a second terminal of the fourth winding, and a first terminal of the fourth winding is coupled with the second DC input node of the inverter.

7. The power conversion system of claim 1, wherein the first winding and the second winding are coupled in series with one another between a first DC output node of the rectifier and a first DC input node of the inverter, and wherein the third winding and the fourth winding are coupled in series with one another between a second DC output node of the rectifier and a second DC input node of the inverter.

8. The power conversion system of claim 7, wherein a first terminal of the first winding is coupled with the first DC output node of the rectifier, a second terminal of the first winding is coupled with a first terminal of the second winding, a second terminal of the second winding is coupled with the first DC input node of the inverter, a second terminal of the third winding is coupled with the second DC output node of the rectifier, a first terminal of the third winding is coupled with a second terminal of the fourth winding, and a first terminal of the fourth winding is coupled with the second DC input node of the inverter.

9. The power conversion system of claim 1, wherein the first winding and the fourth winding are coupled in series with one another between a first DC output node of the rectifier and a first DC input node of the inverter, and wherein the second winding and the third winding are coupled in series with one another between a second DC output node of the rectifier and a second DC input node of the inverter.

10. The power conversion system of claim 9, wherein a first terminal of the first winding is coupled with the first DC output node of the rectifier, a second terminal of the first winding is coupled with a second terminal of the fourth winding, a first terminal of the fourth winding is coupled with the first DC input node of the inverter, a first terminal of the second winding is coupled with the second DC output node of the rectifier, a second terminal of the second winding is coupled with a second terminal of the third winding, and a first terminal of the third winding is coupled with a second DC input node of the inverter.

11. An integrated DC link choke, comprising:
    a core structure comprising:
       a first leg including first and second ends and an intermediate portion disposed between the first and second ends,
       a second leg including first and second ends and an intermediate portion disposed between the first and second ends,
       a third leg extending between the first ends of the first and second legs, and
       a fourth leg extending between the second ends of the first and second legs;
    at least one shunt providing a magnetic flux path between intermediate portions of the first and second legs;
    a first winding forming a first coil coupled between a rectifier DC output and an inverter DC input, the first winding forming at least one turn around the first leg between the intermediate portion and the first end of the first leg;
    a second winding forming a second coil coupled between the rectifier DC output and the inverter DC input, the second winding forming at least one turn around the first leg between the intermediate portion and the second end of the first leg;

a third winding forming a third coil coupled between the rectifier DC output and the inverter DC input, the third winding forming at least one turn around the second leg between the intermediate portion and the first end of the second leg; and a fourth winding forming a fourth coil coupled between the rectifier DC output and the inverter DC input, the fourth winding forming at least one turn around the second leg between the intermediate portion and the second end of the second leg.

12. The integrated DC link choke of claim 11, comprising at least two shunts providing the magnetic flux path between intermediate portions of the first and second legs.

13. The integrated DC link choke of claim 11, wherein the core structure comprises a plurality of laminates.

14. The integrated DC link choke of claim 11, wherein the core structure has no gaps in or between the legs.

15. The integrated DC link choke of claim 11, wherein the first winding and the third winding are coupled in series with one another, and wherein the second winding and the fourth winding are coupled in series with one another.

16. The integrated DC link choke of claim 15, wherein a second terminal of the first winding is coupled with a second terminal of the third winding, and wherein a second terminal of the second winding is coupled with a second terminal of the fourth winding.

17. The integrated DC link choke of claim 11, wherein the first winding and the second winding are coupled in series with one another, and wherein the third winding in the fourth winding are coupled in series with one another.

18. The integrated DC link choke of claim 17, wherein a second terminal of the first winding is coupled with a first terminal of the second winding, and wherein a first terminal of the third winding is coupled with a second terminal of the fourth winding.

19. The integrated DC link choke of claim 11, wherein the first winding and the fourth winding are coupled in series with one another, and wherein the second winding and the third winding are coupled in series with one another.

20. The integrated DC link choke of claim 19, wherein a second terminal of the first winding is coupled with a second terminal of the fourth winding, and wherein a second terminal of the second winding is coupled with a second terminal of the third winding.

* * * * *